United States Patent [19]

Wurdack et al.

[11] Patent Number: 4,496,890
[45] Date of Patent: Jan. 29, 1985

[54] ANTENNA ROTATOR CONTROLLER

[75] Inventors: Gerard A. Wurdack, Glencoe, Mo.; Gene L. Morgan, St. Clair County, Ill.

[73] Assignee: Gerard A. Wurdack & Associates, Inc., St. Louis, Mo.

[21] Appl. No.: 357,071

[22] Filed: Mar. 11, 1982

[51] Int. Cl.³ .............................................. G05B 19/26
[52] U.S. Cl. .................................... 318/600; 318/601; 318/681; 318/663; 318/372; 340/686; 364/185
[58] Field of Search ............... 318/673, 664, 663, 261, 318/372, 681, 614, 601, 600, 602; 340/686, 19 A; 364/185, 189, 191

[56] References Cited

U.S. PATENT DOCUMENTS

| 3,256,473 | 6/1966 | Simopoulos et al. | 318/602 |
| 3,300,701 | 1/1967 | Miller et al. | 318/372 X |
| 3,826,964 | 7/1974 | Byrne | 318/602 |
| 4,072,886 | 2/1978 | Dammeyer | 318/602 |
| 4,263,539 | 4/1981 | Barton | 318/663 X |
| 4,352,202 | 9/1982 | Carney | 318/602 X |

FOREIGN PATENT DOCUMENTS 0097950  8/1979  Japan .................. 340/19 A

Primary Examiner—B. Dobeck
Attorney, Agent, or Firm—Senniger, Powers, Leavitt and Roedel

[57] ABSTRACT

Controller for an antenna rotator having a rotatable member on which is mounted an antenna to be rotated to various headings. Switching circuitry selectively energizes a motor in the rotator to rotate the member in either of two, opposite directions. Antenna headings are user selectable and pre-programmable, the controller including control circuitry for accepting pre-programmed headings entered from a keyboard, storing the pre-programmed headings and retrieving headings. Users can select a pre-programmed heading or enter a new heading via the keyboard, the control circuitry controlling the motor switching circuitry to rotate the antenna to the selected heading. Circuitry is also provided to energize a brake solenoid in the rotator to, in the absence of jamming or binding, release the brake. To rotate the member to a new heading, the control circuitry energizes the brake solenoid and alternately rotates the member small amounts in the two opposite directions to effect the release of the brake from any jammed or bound condition. Selected headings and current headings are acoustically announced to the user over a speaker.

19 Claims, 14 Drawing Figures

ANTENNA ROTATOR CONTROLLER

BACKGROUND OF THE INVENTION

This invention relates to apparatus for controlling antenna rotators and more particularly to apparatus especially suited for controlling antenna rotators which are used to frequently change the antenna heading.

Antenna rotators and controllers are widely used for applications, such as amateur radio, where the antenna heading needs to be changed frequently, conveniently and reliably. Typical of antenna rotators and controllers are those available under the trade designations Ham and Tailtwister from Cornell-Dubilier Electronics Division of Federal Pacific Electric Company of Fuguay-Varina, N.C. Such rotator units each include a potentiometer for sensing the angular position of the upper rotator housing (to which is mounted the antenna), a brake system including a solenoid-operated wedge and sixty equally spaced grooves cast into the lower housing of the rotator to receive the wedge, a motor for rotating an antenna clockwise or counterclockwise; and a pair of limit switches for sensing when the upper housing nears the 0 degree and 360 degree angle positions. The controller for this rotator includes a brake release switch, a clockwise rotation switch, a counterclockwise rotation switch, and an analog panel meter for visually displaying the antenna heading. While the brake release switch is held closed by the operator, the brake solenoid is energized which, absent binding, disengages the brake. To rotate the antenna using this type controller, the operator must first depress and hold the brake release switch to release the brake, and then depress and hold the desired one of the rotation switches. When the desired rotation is nearly complete, as displayed on the analog panel meter, the depressed rotation switch is released and the antenna is allowed to "coast" to a stop. Once the antenna stops, the brake release switch is released to engage the brake.

Several problems arise in use of controllers such as the Cornell-Dubilier controllers described above. The operator's attention and simultaneous manual actuation of two switches is required for the entire time the rotator is turning with such controllers. With large antenna systems, inadvertently releasing the brake release switch while the antenna is still in motion can damage the brake, the antenna, or the tower. The motor in rotator systems with such controllers is either fully on or fully off, which causes large forces to be applied to the tower and antenna when starting and stopping rotation. Under certain conditions the momentum of the antenna or the wind may carry the rotator past one of the rotation limit switches, which can damage the limit switches and the position sensing potentiometer. These controllers also allow reversal of direction of rotation while the antenna is in motion. Such a reversal can damage the rotator, the tower, and the antenna. High winds can cause side forces to be applied to the brake wedge of these rotators, preventing them from disengaging. And the analog panel meter, which displays the antenna heading, is not easy to read, particularly quickly, as is sometimes required in radio amateur (ham) contests. More generally, the Cornell-Dubilier controllers require too much operator attention during ham contests. Moreover they are difficult, if not impossible for the handicapped ham, and particularly the blind ham, to use effectively.

SUMMARY OF THE INVENTION

Among the several objects of this invention may be noted the provision of a controller for antenna rotators which requires minimal operator attention; the provision of such a controller which ensures that the brake is not engaged while the antenna is still in motion; the provision of such a controller which reduces the forces applied to the tower and antenna during starting and stopping; the provision of such a controller which prevents damage to rotation limit switches and the position sensing potentiometer; the provision of such a controller which prevents reversal of the direction of rotation while the antenna is in motion; the provision of such a controller which facilitates disengagement of the brake even during high wind conditions; the provision of such a controller which displays the antenna heading in a form which is easily read; the provision of such a controller which is particularly suited for use in ham contests; the provision of such a controller which is readily usable by handicapped, and particularly blind, hams; and the provision of such a controller which is relatively simple and inexpensive in construction.

Briefly, in a first aspect the antenna rotator controller of this invention includes motor switch means for selectively energizing an electric motor of the rotator to rotate a rotatable member of the rotator, on which is mounted an antenna to be rotated, in either of two opposite directions to a desired heading. The controller also includes user operable means for selecting headings, control means for storing a plurality of selected headings and for controlling the motor switch means, user operable means for initiating the storage of selected headings in a memory, and user operable means for initiating the rotation of the rotatable member to a selected heading stored in the memory. The memory in which the selected headings are stored is an electronic memory which is part of the control means. The control means is responsive to operation of the heading selecting means and the storage initiating means to store a selected heading in memory and is responsive to operation of the rotation initiating means to retrieve the selected heading from memory and to control the motor switch means to rotate the rotatable member to the selected heading.

In a second aspect the antenna rotator controller of this invention includes motor switch means for selectively energizing an electric motor of the rotator to rotate a rotatable member of the rotator, on which is mounted an antenna, in a first direction and for selectively energizing the motor to rotate the member in a second, opposite direction. The rotator also has a spring-biased, solenoid retractable brake for holding the rotatable member against rotation. The controller further includes brake switch means for selectively energizing the brake solenoid to, in the absence of jamming or binding, release the brake to permit rotation of the rotatable member; user operable means for initiating rotation of the rotatable member; and control means for controlling the brake switch means and the motor switch means. The control means is responsive to operation of the initiating means to control the brake switch means to energize the brake solenoid and to control the motor switch means to alternately rotate the rotatable member small amounts in the first and second directions to effect the release of the brake from any jammed or bound condition.

In a third aspect the antenna rotator controller of this invention includes motor switch means for selectively energizing an electric motor of the rotator to rotate to a desired heading a rotatable member of the rotator. An antenna to be rotated in either of two opposite directions is mounted on the rotatable member. The controller also includes an electromechanical speaker and control means connected to detecting means in the rotator. The detecting means detects the heading of the rotatable member and the control means controls the motor switch means to rotate the rotatable member and periodically generates digital signals representing the headings detected by the detecting means. Means are connected to the control means and to the speaker for converting the digital signals representing headings into corresponding analog input signals from which the speakers acoustically announces the headings detected by the heading detecting means.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
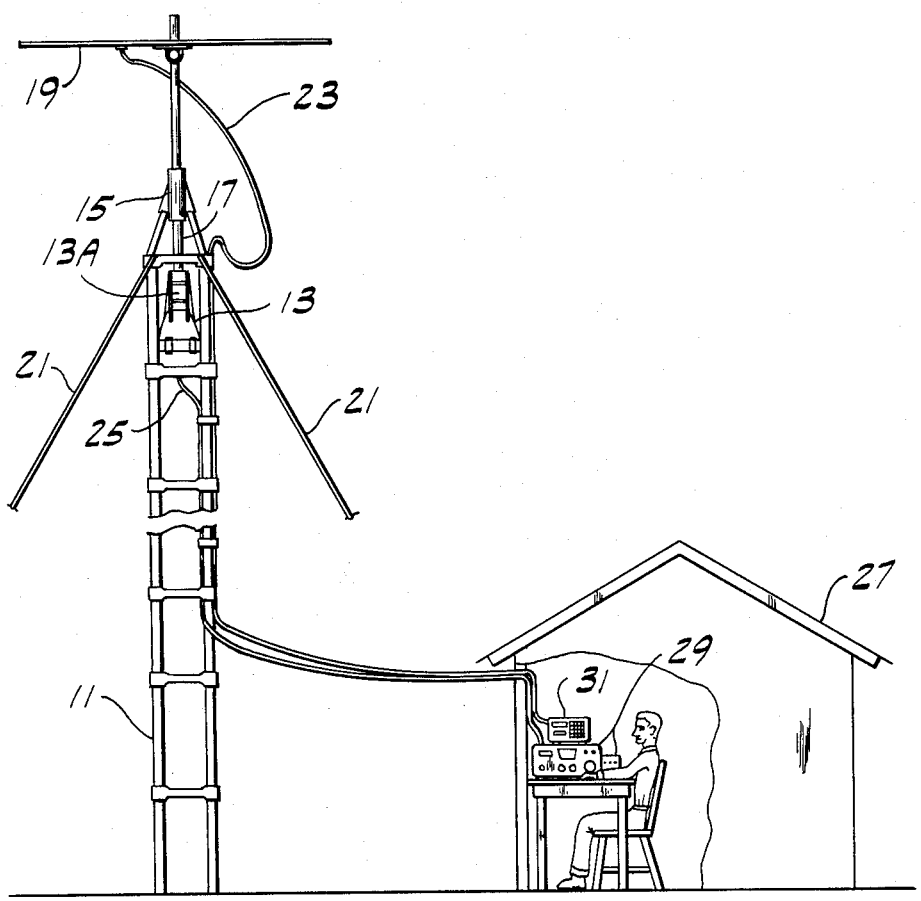
FIG. 1 is a perspective of an amateur radio installation including an antenna rotator controller of this invention, with parts broken away.

Referring to FIG. 1, there is shown an exemplary amateur radio installation including a tower 11 upon which is mounted an antenna rotator 13 such as one of the Cornell-Dubilier rotators described above. The tower includes a top bushing 15 through which passes a mast 17 of an antenna 19. The lower portion of mast 17 is suitably secured to an upper portion 13A of the housing of rotator 13 with the base portion of rotator 13 being secured to the tower. Upper housing portion 13A constitutes a rotatable member on which is mounted an antenna to be rotated, the angles of rotation of said member from a predetermined angular position of the member constituting a heading. For example, if the antenna is aligned with the rotator member so that in the rotator's full counterclockwise position the antenna points north, the rotator heading would be 0° and the antenna heading would be 0°. Conversely, the full clockwise position of the upper portion 13A is a rotator heading of 360°. Tower 11 may be stabilized by a number of guy wires 21. Two cables 23 and 25 extend between the tower and a suitable enclosure (shack) 27 for the amateur radio receiving and transmitting equipment 29 (here shown as a transceiver) and a controller 31 of this invention. Cable 23 connects the antenna itself with the transceiver while cable 25 connects the antenna rotator to controller 31.

Figure 2:
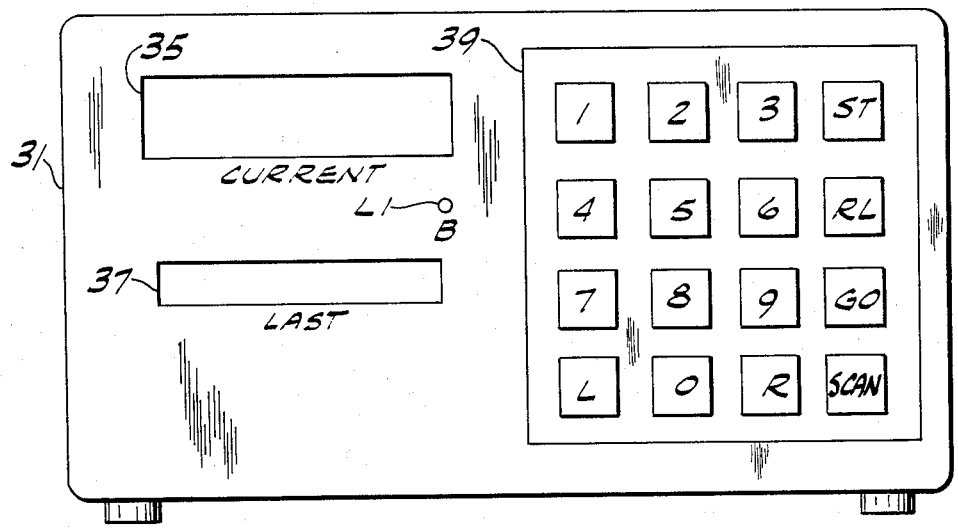
FIG. 2 is a front elevation of the antenna rotator controller of this invention.

Controller 31 (shown in more detail in FIG. 2) has a three-digit, seven-segment display 35 for digitally displaying the current antenna heading, a second three-digit seven-segment display 37 for digitally displaying the last fixed antenna heading worked by the operator and for displaying several condition indications, a light-emitting diode (LED) indicator lamp L1 for indicating a brake engaged condition. Controller 31 also includes a keyboard 39 containing the following sixteen keys in matrix form: ten numeral keys labelled "0" to "9", constituting user operable means for entering and selecting headings, a STORE key ST constituting user operable means for initiating the storage in a memory of up to nine (for example) antenna headings entered via the keyboard, a RECALL LAST switch RL, constituting means for initiating the recalling from the memory of the last heading worked and for initiating rotation to that heading, a Go switch labelled Go, constituting means for initiating rotation to a new heading entered from the keyboard or from memory, a Scan switch SCAN constituting user operable means for initiating scanning rotation of the upper housing and antenna, a RIGHT rotate switch labelled R for initiating and effecting rotation of the antenna to the right, and a LEFT rotate switch labelled L for initiating and effecting rotation of the antenna to the left.

Figure 3:
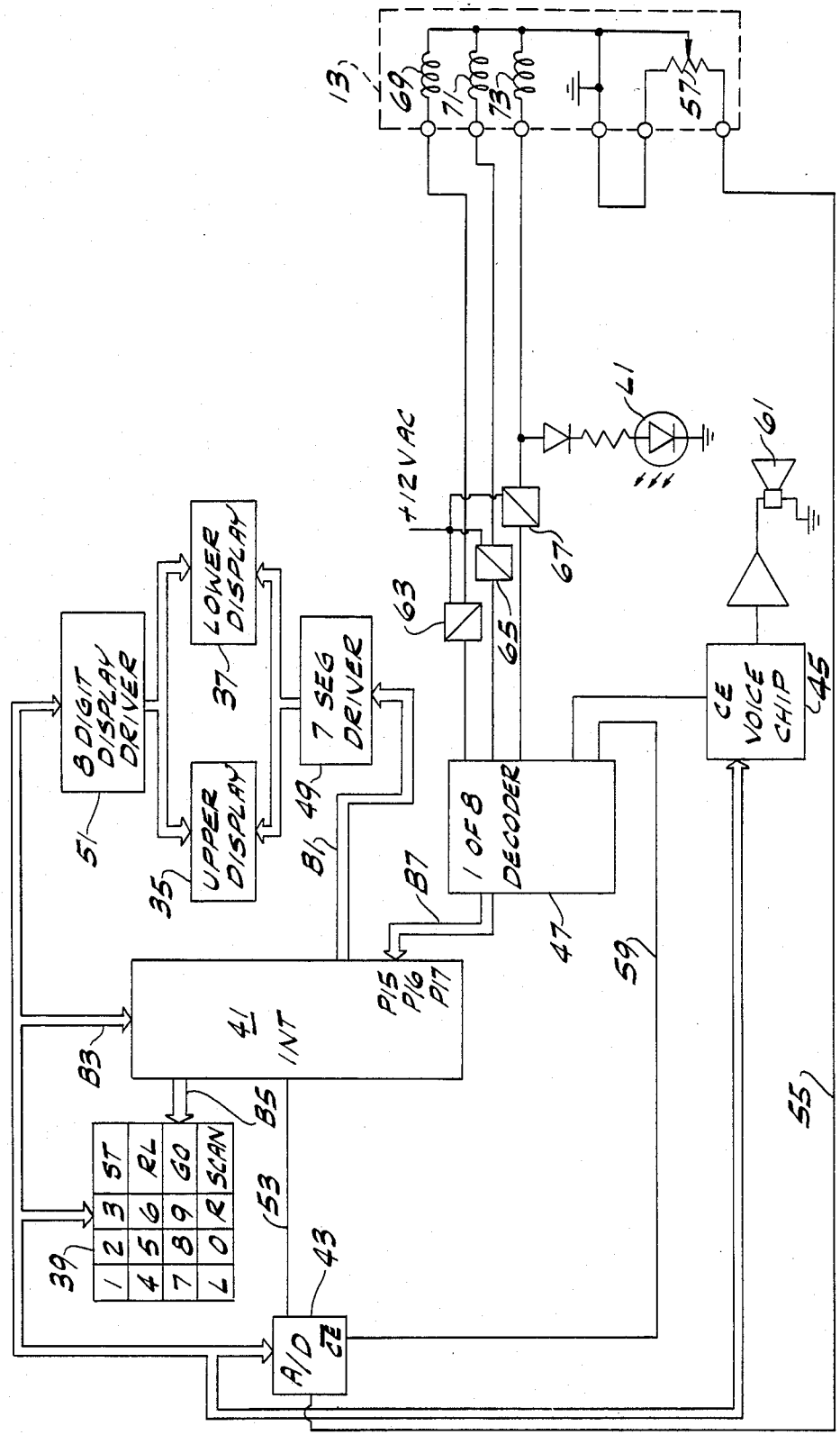
FIG. 3 is a schematic of the electrical circuitry of the controller of this invention and of an antenna rotator controlled thereby.

Turning to FIG. 3, the circuitry of controller 31 is shown to include a microcomputer 41, which is preferably a microcomputer sold by Intel under the trade designation Model 8748. Microcomputer 41 includes an internal memory for, inter alia, storing user pre-programmed or selected headings. Microcomputer 41 is connected via four buses B1, B3, B5 and B7 to keyboard 39, an analog to digital converter (ADC) 43, a voice synthesizing integrated circuit chip 45 (preferably a chip sold under the trade designation Digitalker by National Semiconductor), a one-of-eight decoder 47, a seven-segment display driver or buffer 49, and an eight-digit display driver or buffer 51. Although four bus connections to microcomputer 41 are shown, this is only for clarity; a smaller or larger number of buses could be used. Display drivers 49 and 51 are conventionally connected to displays 35 and 37 to cause the display of characters and digits selected by the microcomputer in those displays.

ADC 43 is connected to microcomputer 41 not only via bus B3 but also via an interrupt line 53. The ADC signals the completion of a conversion to the microcomputer over this line. The analog input which is to be converted to digital form by the ADC is supplied thereto over a line 55 from an angular position detecting potentiometer 57 in the antenna rotator itself which potentiometer constitutes means for detecting the heading of the upper housing portion and the antenna. The digital output of ADC 43 therefore represents the antenna heading at the time of the conversion. This output is supplied via bus B3 to the microcomputer.

Microcomputer 41 controls a number of peripheral devices through 1-of-8 decoder 47. One output of decoder 47, via a line 59, controls the chip enable pin of ADC 43, so that microcomputer 41 can initiate a conversion by causing line 59 to go to a logic Low. Another output of decoder 47 is connected to the chip enable pin of voice chip 45. When enabled, voice chip 45 provides an audio output corresponding to the digital input supplied thereto by the microcomputer over bus B3. This audio output is buffered and supplied to an electromechanical speaker 61 mounted inside controller 31. Voice chip 45 constitutes means connected to the microcomputer 41 and to the speaker for converting the digital signals from the microcomputer representing headings into corresponding analog input signals from which the speaker acoustically announces the headings detected by potentiometer 57 or the headings selected by the user via the keyboard, as applicable.

The upper three outputs of decoder 47 are connected to three triacs labelled 63, 65 and 67 which supply power, when the corresponding outputs of decoder 47 are High, to a motor winding 69 for causing left (counterclockwise) rotation of the antenna, to a motor winding 71 for causing right (clockwise) rotation of the antenna 71, and to a solenoid 73 for retracting the brake, respectively. Windings 69 and 71 are part of the electric motor in the rotator adapted to selectively rotate the upper housing in a first direction (left) and in a second, opposite direction (right). Thus, triacs 63 and 65 constitute motor switch means for selectively energizing the electric motor to rotate the upper housing either left or right, respectively. And triac 67 constitutes brake switch means for energizing the brake solenoid to, in the absence of jamming or binding, release the brake to permit rotation of the rotatable member. Microcomputer 41 and decoder 47 constitute means for controlling triacs 63, 65 and 67. Brake-on indicator lamp L1 is connected through a diode D1 to triac 67 so that whenever the brake solenoid is energized the indicator lamp lights.

Figure 4:
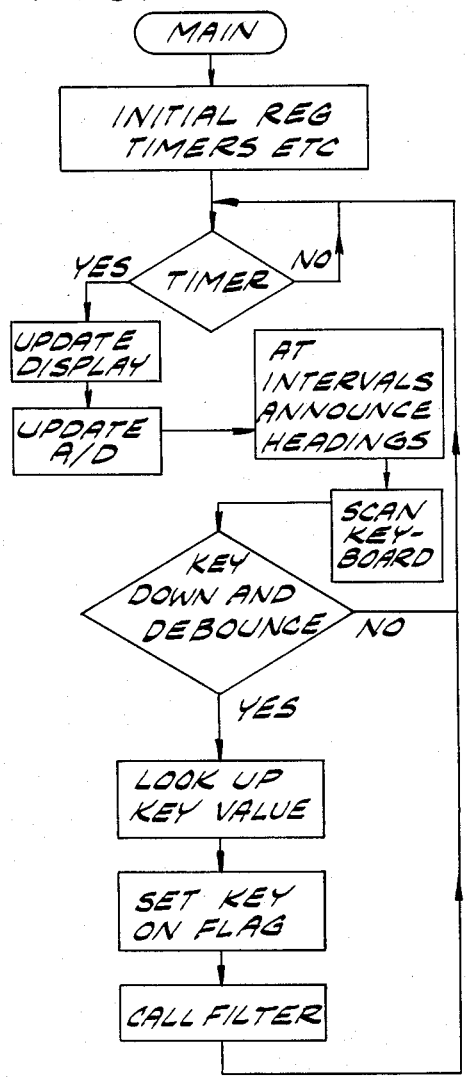
FIGS. 4–14 are flowcharts for the program of a microcomputer included in the controller of this invention.
Figure 7:
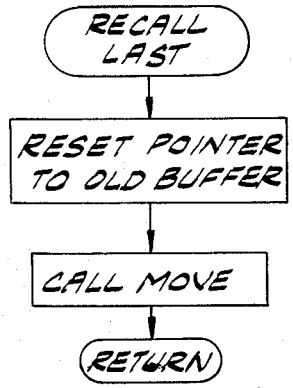

The operation of controller 31 can be more clearly understood by referring to the flowcharts for the program microcomputer 41 (FIGS. 4-14). The main body of the program is shown in FIG. 4 in the flowchart labelled Main. The first action of Main is to initialize the system, including several registers and an eight-bit timer. Next the microcomputer waits for the internal timer to overflow which happens every millisecond and generates an interrupt. Once overflow occurs, microcomputer 41 updates displays 35 and 37, updates the current antenna heading by initiating and reading a conversion by ADC 43, at appropriate intervals (e.g., 30 seconds) announces the headings over speaker 61, and scans the keyboard for a key or switch closure. More particularly, microcomputer 41 updates displays 35 and 37 by supplying the appropriate signals over buses B1 and B3 to seven-segment display driver 49 and eight-digit display driver 51 to illuminate the desired character in the correct digit of the displays; it initiates a conversion by ADC 43 by causing line 59 to go low; it announces the headings by supplying a digital signal representing the heading over bus B3 to chip 45 while enabling that chip via decoder 47; and it scans keyboard 39 by strobing the rows of the keyboard matrix and reading the columns thereof to detect and identify any closed key or switch. After scanning the keyboard, the microcomputer then debounces any closed key to ensure that a true switch closure exists. If there was no true switch closure, microcomputer returns to wait for the next timer overflow.

Figure 5:
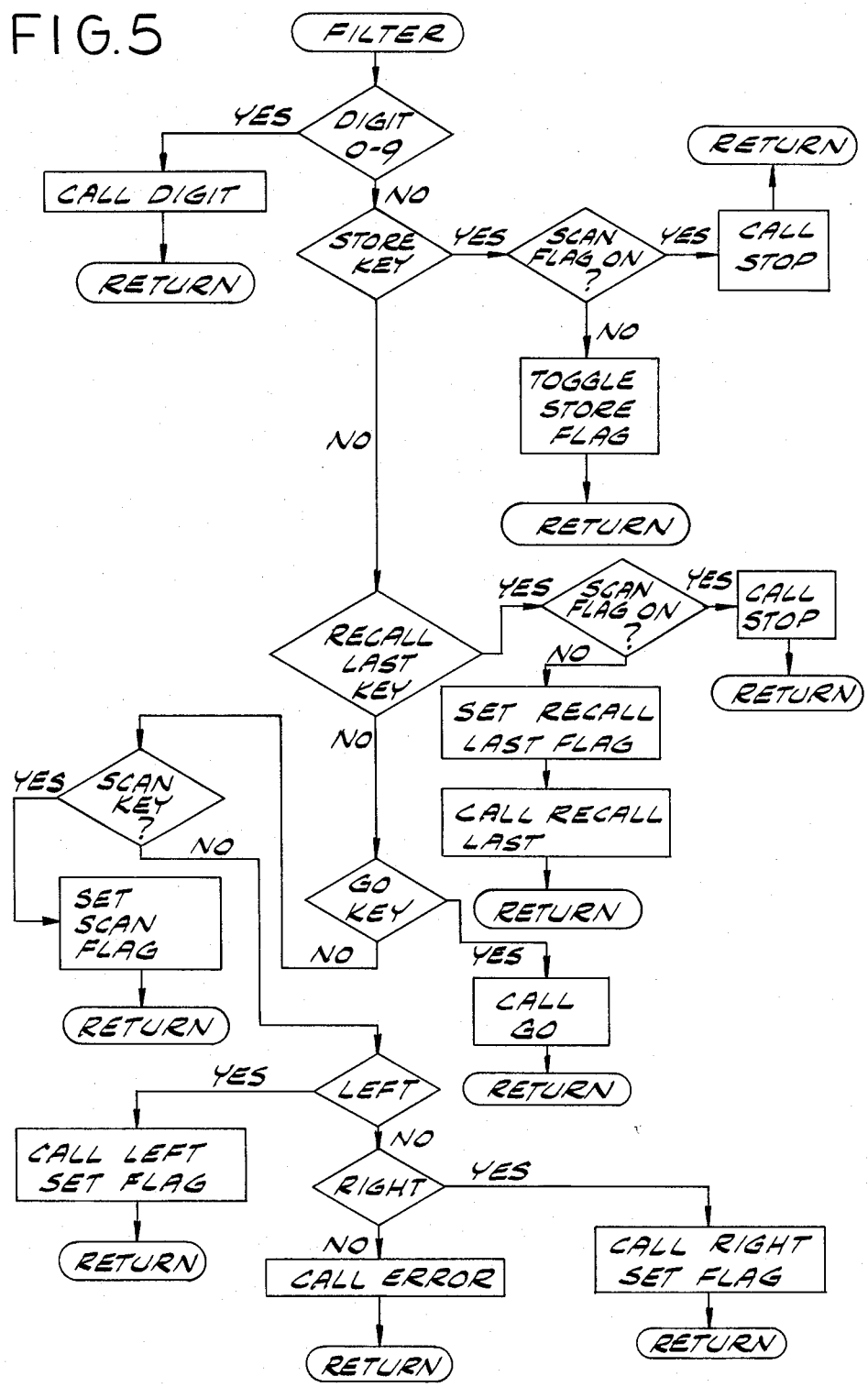
Figure 6:
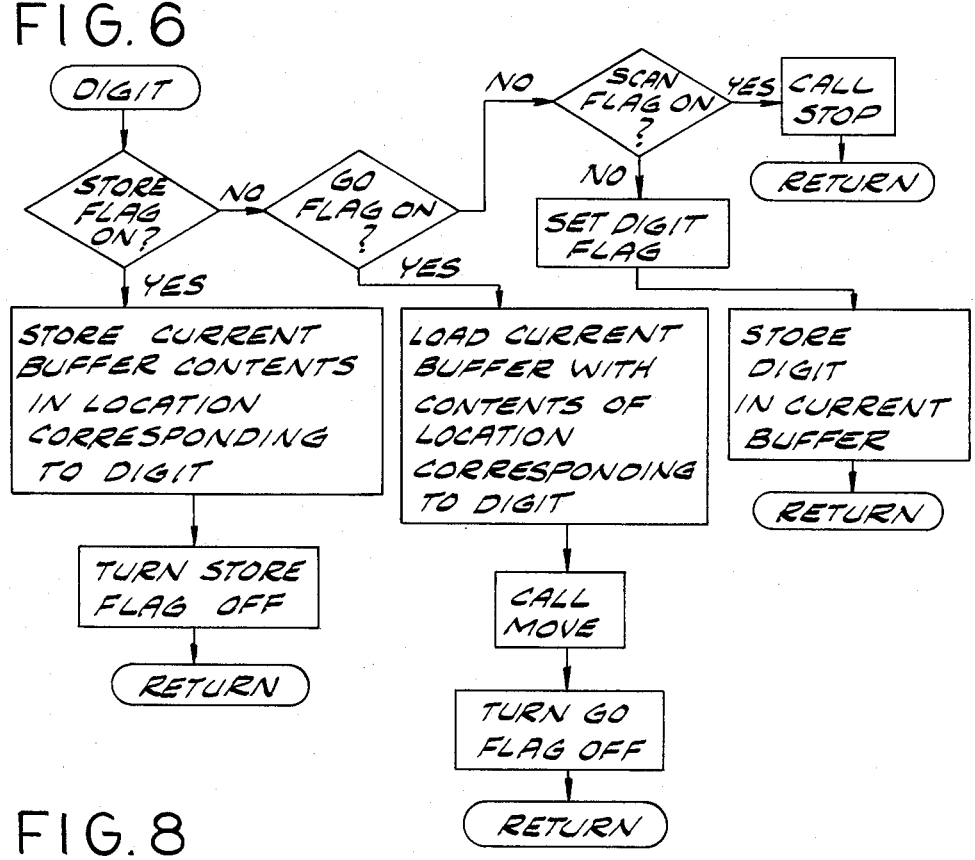

In the event of a true switch closure, microcomputer 41 looks up the value of the closed switch or key, sets a flag uniquely identifying the closed switch, and calls a subroutine labelled Filter (see FIG. 5). The Filter subroutine selects various action subroutines in response to the last key closed and the preexisting state of the controller. For example, in the Filter subroutine microcomputer 41 first checks to see if the key closed was a digit key, representing the entry of a number from zero to nine. There are several different situations, or states, in which the user might press a digit key. A digit key must be pressed to enter a new heading for the antenna; one must be pressed, after closure of the Store switch, to store a heading in memory; and one must be pressed, after closure of the Go switch, to retrieve a heading stored in memory. If the key pressed was a digit, microcomputer 41 calls a subroutine labelled Digit (see FIG. 6) to determine the proper action. In the Digit subroutine, microcomputer 41 determines if it is in the Store state by checking to see if a Store flag is on, which would indicate that the previous switch closed was the Store switch. If the Store flag is on, the user has pressed, in sequence, the Store switch and a digit, which means he is trying to store the contents of a buffer, namely the current buffer (whose contents are displayed in display 35), in the one of nine memory locations corresponding to the selected digit. Microcomputer 41 performs this operation, turns the Store flag off, and returns to the Main routine. On the other hand, if the Store flag is not on microcomputer 41 checks to see if a Go flag is on, which would mean that the previous switch closed was the Go switch. If the Go flag is on, the user has pressed, in sequence, the Go switch and a digit, which is the required operation to recall antenna headings from memory and cause the antenna to rotate to that heading. For example, if the user presses the Go switch and the 3 switch in that order, microcomputer 41 will retrieve the antenna heading in the memory location corresponding to the digit 3, store that heading in the current buffer, and call a subroutine labelled Move (described infra) to cause the antenna to rotate to the heading now stored in the current buffer. After returning from the Move subroutine, microcomputer 41 turns off the Go flag and returns to the Main routine.

In the event neither the Store flag nor the Go flag is on in subroutine Digit, microcomputer 41 checks to see if a Scan flag is on, representing the fact that the controller is in a scan mode in which it intermittently scans left or right as selected by the user until a key other than the Scan, Left and Right keys is pressed. If the Scan flag is on, microcomputer 41 calls a subroutine labelled Stop, described infra, to stop rotation of the antenna because the key pressed was a digit key, not the Scan, Left or Right key. On the other hand, if the Scan flag is not on, microcomputer 41 sets a Digit flag (to represent the fact that the last key pressed was a digit key) stores the digit in the current buffer, and returns to the Main routine. The current buffer is a three-digit ring buffer, so entry of the digit into that buffer occur at the least significant position. As subsequent digits are entered, the first digit rotates left until it passes out of the ring buffer and is lost. For example, consider the entry of the following series of digits into the current buffer: 12345. Upon entry of the digit 1, the numeral 1 is displayed in the right-most digit of display 35. Upon entry of the next digit, the numeral 1 is displayed in the middle digit of display 35 and the numeral 2 is the right-most digit in that display. Upon entry of the third digit, the display shows "123". Upon entry of the fourth digit, "234" is displayed. And upon entry of the fifth digit; "345" is displayed. This heading could then be stored by pressing the Store switch and a memory location digit.

Referring back to FIG. 5, if during the Filter subroutine the key closed is not a digit key, microcomputer 41 then checks to see if it was the Store key. If so, it then checks the Scan flag. If the Scan flag is on, rotation is stopped because a switch other than Scan, Left or Right has been pressed during the Scan mode. Otherwise, microcomputer 41 toggles the Store flag. In either event, after performing the indicated action, the microcomputer returns to the Main routine.

In the event that neither a digit key nor the Store key is the key which was pressed, the microcomputer then determines if the key pressed was the Recall Last key. If it was, the Scan flag is checked and, if it is set, rotation is stopped. If the Scan flag is not set a Recall Last flag is set and a subroutine labelled Recall Last (FIG. 7) is called. In subroutine Recall Last, a pointer is reset to a Recall Last buffer, which contains the last fixed heading of the antenna, and subroutine Move is called. After subroutine Move is executed, microcomputer 41 returns to the Main routine.

Figure 8:
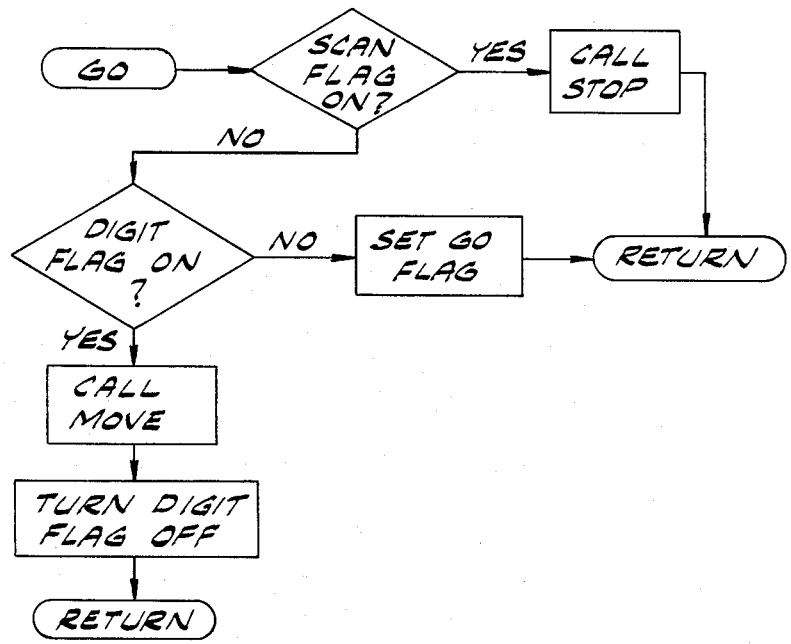

In those cases in which the pressed switch is not a digit switch, the Store switch, or the Recall Last switch, the microcomputer checks to see if the Go switch is the switch which was pressed. If it was, microcomputer 41 calls a subroutine labelled Go (FIG. 8). In subroutine Go, the Scan flag is checked and if it is on rotation is stopped and the microcomputer returns to the Main routine. Otherwise, the Digit flag is checked to see if the previous key pressed was a digit. If it was, the user has entered a new heading into the current buffer and now wants to rotate the antenna to this new heading. Microcomputer 41 performs this action in subroutine Move, turns the digit flag off, and returns to the Main routine. On the other hand, when the Digit flag is not on, the user has not entered a new heading but rather is starting to retrieve a stored heading from memory. In this case, microcomputer 41 sets the Go flag and returns to the Main routine.

Figure 9:
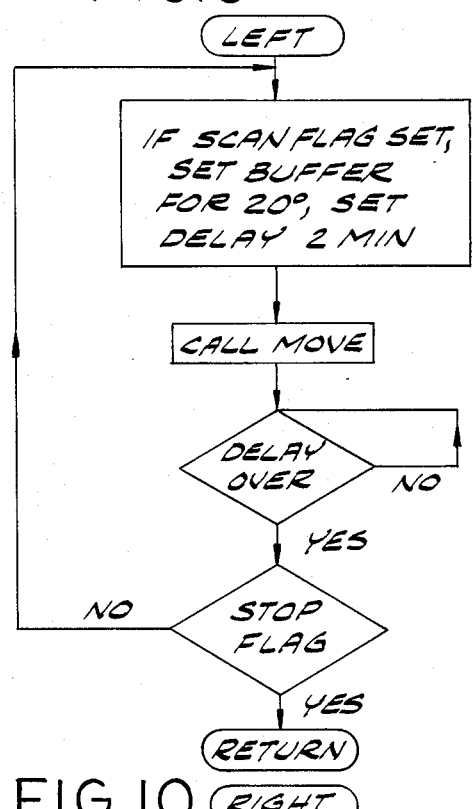
Figure 10:
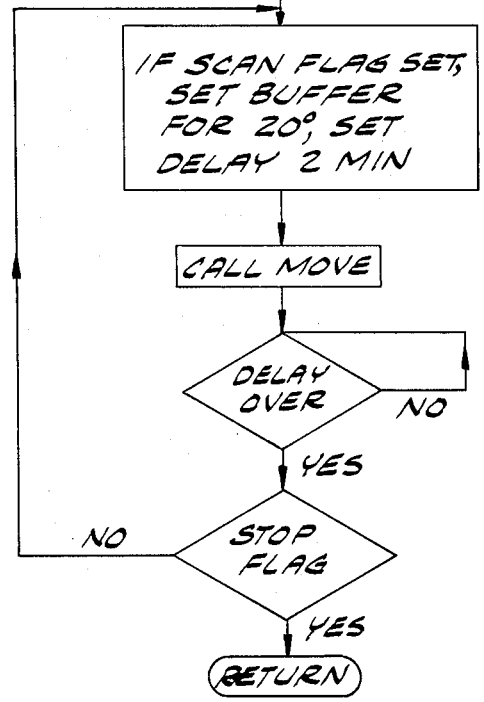

The remaining keys to be checked by subroutine Filter (FIG. 5) are the Scan key, the Left key and the Right key. The Scan key is checked first. If the Scan key is the key which was pressed, microcomputer 41 sets the Scan flag and returns to the Main subroutine. If not, it checks to see if the Left switch was the switch pressed. If the Left key was the switch pressed, the microcomputer sets a Left flag and calls a subroutine labelled Left (FIG. 9). In subroutine Left, the microcomputer prepares for intermittent scanning if the Scan flag is set by setting a buffer to 20°, which is a preset increment between scan positions, and setting a two minute delay. Then subroutine Move is called. After that subroutine is executed, microcomputer 41 checks to see if the delay (two minutes in the case of the scanning mode, zero otherwise) has expired. Once the delay has expired, a Stop flag is checked. If it is set the microcomputer returns to subroutine Main. Otherwise subroutine Left is repeated.

In the event neither the Left switch nor any of the other switches previously discussed is the switch which was pressed, microcomputer 41 checks to see if the switch pressed was the Right switch. If it was a Right flag is set and a subroutine labelled Right (FIG. 10) is called. Subroutine Right is essentially the same as the Left subroutine except for the direction of rotation of the antenna. If the Right key was also not the key pressed, an error has been made and a subroutine labelled Error is called. Subroutine Error simply causes the characters ERR to be displayed in display 37. The controller is reset by pressing any one of the switches on the keyboard.

Figure 11:
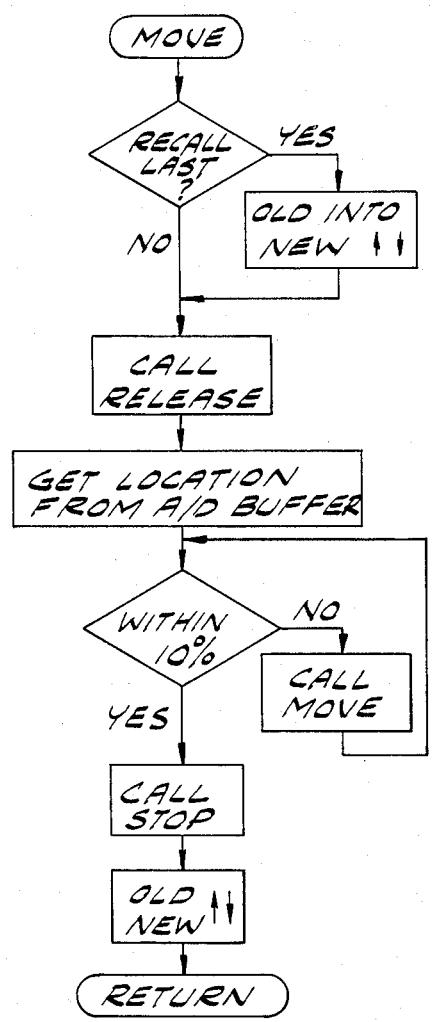
Figure 12:
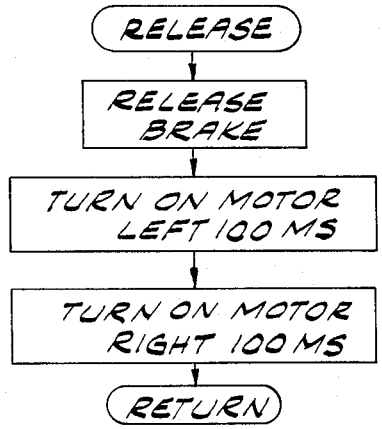
Figure 13:
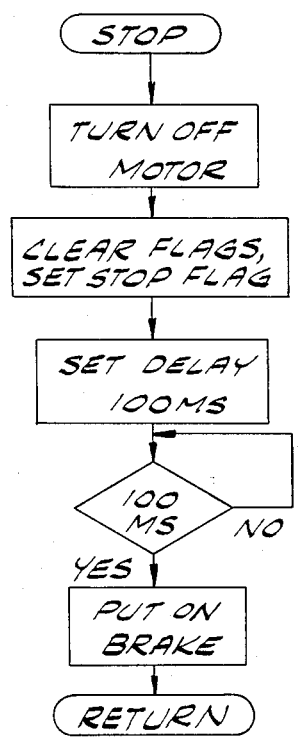

Actual rotation of the antenna is controlled by microcomputer 41 through subroutine Move (FIG. 11). If the Recall Last flag has been set, the contents of the Last Heading buffer and the Current buffer are interchanged. In the Move subroutine, rotation always occurs to the heading contained in the Current buffer, so to rotate to the last heading the contents of the Last Heading buffer and the Current buffer are exchanged. Next microcomputer 41 calls a subroutine labelled Release (FIG. 12). In subroutine Release the microcomputer releases the brake by switching on triac 67 (see FIG. 3) which energizes brake solenoid 73. Then it turns the motor on for left rotation for 100 msec by turning on triac 63 to energize winding 69. Next microcomputer 41 turns the motor on for right rotation for 100 msec by turning on triac 65 to energize winding 71. This procedure ensures that the brake actually is disengaged even when the antenna is jammed or bound, such as might occur under a wind load. Microcomputer 41 then returns to subroutine Move. Next it examines a buffer containing the latest heading from ADC 43 and compares this heading with desired heading (contained in the Current buffer). If these headings are the same within a preset amount, for example 10%, microcomputer 41 calls subroutine Stop (FIG. 13). In subroutine Stop the motor is turned off by switching off the appropriate triac 63 or 65, all flags discussed are cleared, and a 100 msec delay is set. Once the delay expires, the brake is put on by deenergizing solenoid solenoid 73 by means of triac 67. The delay of 100 msec automatically ensures that the rotator has come to a complete stop before the brake is engaged.

Figure 14:
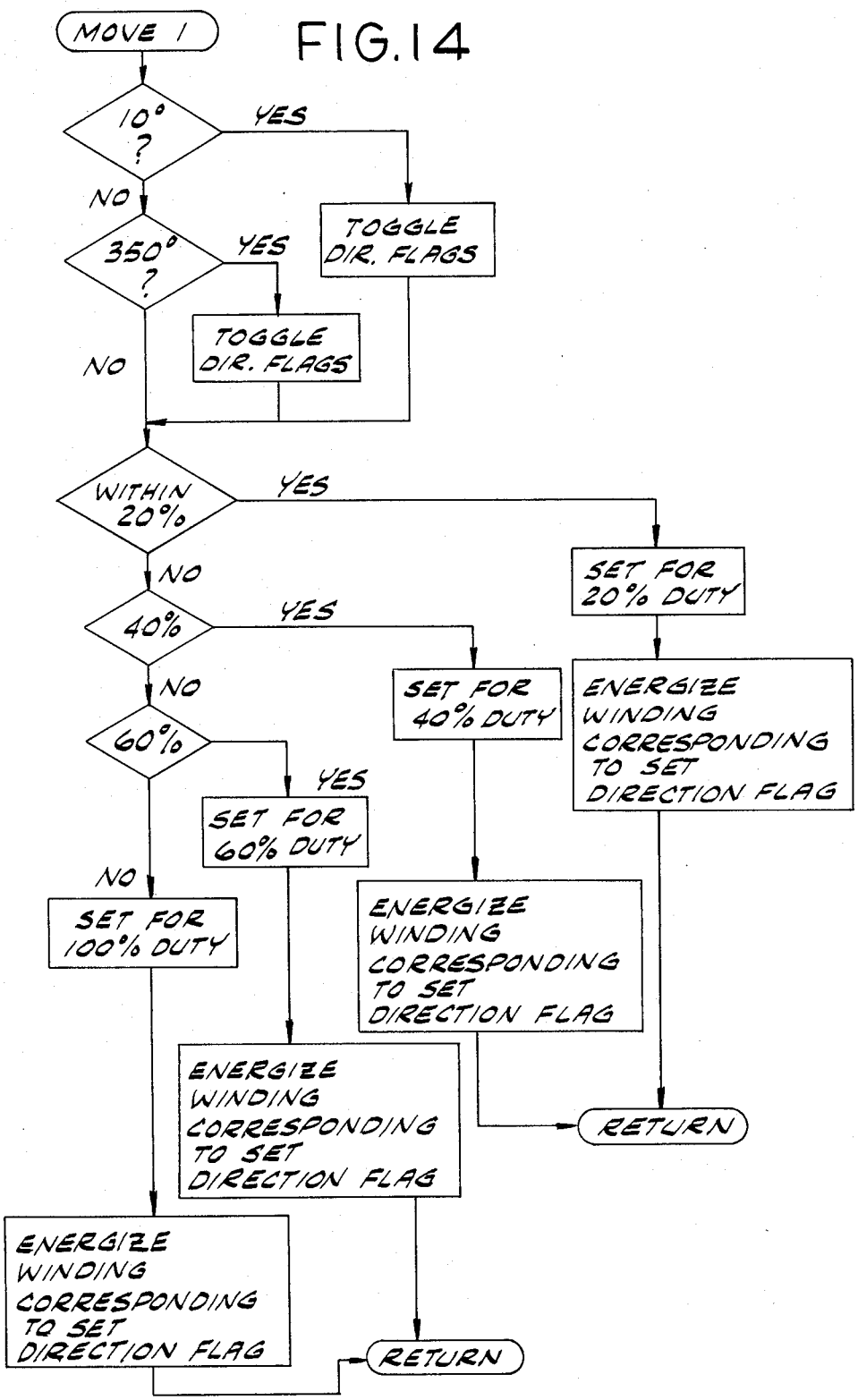

Assuming in the Move subroutine (FIG. 11) the present heading is not within 10% of the desired heading, microcomputer 41 then calls a subroutine labelled MOVE 1 (FIG. 14). In subroutine MOVE 1, the microcomputer first checks the A/D buffer to see if the antenna is within 10° of zero. If it is, the direction flags are toggled, that is if the Left flag is set it is reset and the Right flag is set or vice versa, so that the direction of rotation is reversed. Next, the same check is made for a position of 350°. If the heading is at least 350°, the direction flags are toggled. This toggling is done to prevent damage to the limit switches located at the extreme clockwise and counterclockwise positions of the rotator and to the position detecting potentiometer.

After making any necessary changes to the direction flags and direction of rotation, microcomputer 41 tests the A/D buffer to see if the antenna is within a preset amount, e.g., 20%, of the desired heading. If it is, the duty cycle of the appropriate triac is set to 20% and the winding corresponding to the set direction flag is energized with a 20% duty cycle, the duty cycle being controllable by controlling the amount of time triacs 63 and 65 are energized. If the antenna is not within 20% of the desired heading, the microcomputer then determines if it is within a larger preset amount, e.g., 40%, of the desired heading. If so, the duty cycle is set at 40%. If not, the antenna heading is again checked to see if it is within still larger amount, e.g., 60%, of the desired heading. If so, the duty cycle is reduced to 60%. If not, the duty cycle is set at 100%. In all cases the windings are energized in accordance with a duty cycle which is reduced as the antenna approaches the desired heading. This feature allows the antenna and rotator to slow down gradually with a corresponding reduction in the possibility of damage to the antenna and rotator caused by sudden stops of the rotator motor and with an improvement in accuracy of the antenna heading.

A series of examples further illustrates the external workings of this invention:

I. Going to a New Heading

To go to a new heading, the user enters the new heading via the digit keys on keyboard 39. As each digit is entered it appears on display 35 and the heading then displayed is announced by speaker 61. Once he has entered the desired new heading, the user presses the Go button which causes the antenna to automatically rotate as described above to the new heading and to stop there. During rotation the antenna slows down as the desired heading is approached to prevent damage to the antenna, tower and rotator and if during rotation the limits of rotation are closely approached, the direction of rotation is reversed.

II. Storing a Heading in Memory

To store a heading in memory, the user presses the Store button and a digit switch after the desired heading is displayed on display 35. The desired heading may have been entered from the keyboard or it can be a heading at which the antenna was stopped during scanning or left or right continuous rotation. In any case, the heading displayed in display 35 at the time the Store button is pressed is stored for later retrieval by the user in the memory location corresponding to the subsequently activated digit key.

III. Go to Last Heading

During operation of the controller, the user may wish to rotate the antenna to the last fixed heading it had before the current fixed heading. To do this he presses the Recall Last button which recalls the previous fixed heading and causes the antenna to rotate to that heading.

IV. Go to a Stored Heading

The controller of this invention can store nine user-selectable headings as described in Example II above for automatic recall. To go to one of these headings the user first presses the Go switch and then presses the digit corresponding to the desired heading. For example if the contents of the memory are as follows:

| Digit | Corresponding Contents |
| --- | --- |
| 1 | 105 |
| 2 | 335 |
| 3 | 276 |
| 4 | 180 |
| 5 | 97 |
| 6 | 135 |
| 7 | 205 |
| 8 | 295 |
| 9 | 83 |

The user can rotate the antenna to 135° by first pressing the Go key and then pressing the "6" key. The controller in response automatically displays 135 in display 35, announces that heading over speaker 61 and rotates the antenna to the heading 135°.

V. Intermittent Scan

To automatically scan intermittently at preset, e.g., 20° increments, the user simply presses the Scan button. Scanning will continue until one of the switches other than Scan, Left and Right is actuated.

VI. Continuous Right or Left Scan

By holding down the Left or the Right button, the user can cause the antenna to rotate in the corresponding direction until the button is released or until the limits of rotation are closely approached (at which point reversal of direction will occur).

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A controller for an antenna rotator having a rotatable member on which is mounted an antenna to be rotated and an electric motor adapted to selectively rotate said member and antenna in either of two opposite directions to a desired heading, said controller comprising:

motor switch means for selectively energizing the electric motor to rotate the rotatable member;

user operable means including a plurality of numeric switches for selecting headings;

control means including an electronic memory for storing a plurality of selected headings and for controlling the motor switch means;

user operable means for initiating the storage of selected headings in the memory, the control means being responsive to operation of the heading selecting means and the storage initiating means to store a selected heading in the memory;

a display connected to the control means and responsive to signals therefrom for displaying headings selected by the user; and user operable means for initiating the rotation of the rotatable member, said control means being responsive to both operation of the rotation initiating means and to the display of either a heading not stored in the memory but selected by actuation of certain numeric switches or to a selected heading retrieved from those previously stored in the memory, thereby to control the motor switch means to rotate the rotatable member to the selected heading displayed.

2. The controller as set forth in claim 1 further including user operable means for initiating rotation of the rotatable member from its current heading to its last fixed heading, said control means having stored therein said last fixed heading and being responsive to operation of the last heading rotation initiating means to control the motor switch means to rotate the rotatable member to the last fixed heading.

3. The controller as set forth in claim 2 further including a second display connected to the control means and responsive to signals therefrom for displaying said last fixed heading.

4. The controller as set forth in claim 1 wherein the rotator has a spring-biased, solenoid retractable brake for holding the rotatable member against rotation, further comprising brake switch means to selectively energize the brake solenoid to release the brake to permit rotation of the rotatable member, said control means being responsive to operation of the rotation initiating means to control the brake switch means to energize the brake solenoid and to control the motor switch means to rotate the rotatable member to the selected heading.

5. The controller as set forth in claim 1 further including user operable means for initiating scanning rotation of the rotatable member, said control means being responsive to operation of the scanning-rotation initiating means to automatically control the motor switch means to rotate the rotatable member a predetermined amount, then stop the rotation, and then rotate said member the predetermined amount again in the opposite direction.

6. The controller as set forth in claim 1 wherein the rotator includes means for detecting the heading of the rotatable member, said control means being connected to the heading detecting means and responsive thereto to decrease the duty cycle of the motor during rotation as the actual heading of the rotatable member, as determined by the heading detecting means, approaches the selected heading whereby as the member approaches the selected heading the velocity of rotation of said member decreases.

7. The controller as set forth in claim 1 wherein the rotator includes means for detecting the heading of the rotatable member, said control means being connected to the heading detecting means and being responsive thereto to periodically generate digital signals representing the heading detected by the detecting means and to periodically indicate the headings detected by the heading detecting means.

8. The controller as set forth in claim 7 which further includes an electromechanical speaker and means connected to the control means and to the speaker for converting the digital signals representing headings into corresponding analog input signals which are periodically indicated by the speaker acoustically announcing the headings detected by the heading detecting means.

9. The controller as set forth in claim 4 which further includes means for indicating when the brake solenoid is energized thereby to permit rotation of the rotatable member.

10. A controller for an antenna rotator having a rotatable member on which is mounted an antenna to be rotated, a spring-biased, solenoid-retractable brake for holding said rotatable member against rotation, and an electric motor adapted to selectively rotate said member and antenna in a first direction and in a second and opposite direction, said controller comprising:
  motor switch means for selectively energizing the electric motor to rotate the rotatable member in the first direction and for selectively energizing the electric motor to rotate the rotatable member in the second direction;
  brake switch means for selectively energizing the brake solenoid to, in the absence of jamming or binding, release the brake to permit rotation of the rotatable member;
  user operable means for initiating rotation of the rotatable member; and
  control means for controlling the brake switch means and the motor switch means, the control means being responsive to operation of the rotation initiating means to control the brake switch means to energize the brake solenoid and to control the motor switch means to alternately rotate the rotatable member small amounts in the first and second directions to effect the release of the brake from any jammed or bound condition.

11. A controller as set forth in claim 10 wherein the angle of rotation of the rotatable member from a predetermined angular position constitutes a heading from 0° to 360°, said rotator having means for detecting the heading of said member, 0° to 360° constituting the limits of rotation of said member, said control means being connected to the heading detecting means and being responsive during rotation of the rotatable member to a signal from said heading detecting means indicating a heading a predetermined amount from the limits of rotation to control the motor switch means to reverse the direction of rotation.

12. A controller as set forth in claim 10 further comprising user operable means for selecting headings, the control means including an electronic memory for storing user selected headings, user operable means for initiating the storage of selected headings in memory, said control means being responsive to operation of the selecting means and the storage initiating means to store a selected heading in memory.

13. A controller as set forth in claim 12 further including user operable means for initiating rotation of the rotatable member to a selected heading stored in the memory, the control means being responsive to operation of the rotation initiating means to retrieve the selected heading from memory and to control the motor switch means to rotate the rotatable member to the selected heading.

14. The controller as set forth in claim 13 further including user operable means for initiating rotation of the rotatable member from its current heading to its last fixed heading, said control means having stored therein said last fixed heading and being responsive to operation of the last heading rotation initiating means to control the motor switch means to rotate the rotatable member to the last fixed heading.

15. The controller as set forth in claim 10 further including user operable means for selecting headings, and a display connected to the control means, said heading selecting means including a plurality of numeric switches, said control means being responsive to operation of the numeric switches to display on the display the heading consisting of the numerals associated with the operated numeric switches, the control means also being responsive to subsequent operation of the rotation initiating means to control the motor switch means to rotate the rotatable member to said displayed heading.

16. The controller as set forth in claim 10 further including user operable means for initiating scanning rotation of the rotatable member, the control means being responsive to operation of the scanning-rotation initiating means to automatically control the motor switch means to rotate the rotatable member a predetermined amount, then stop the rotation, and then rotate said member the predetermined amount again in the opposite direction.

17. The controller as set forth in claim 8 wherein the rotator includes means for detecting the heading of the rotatable member, said control means being connected to the heading detecting means and responsive thereto to decrease the duty cycle of the motor during rotation as the actual heading of the rotatable member, as determined by the heading detecting means, approaches a selected heading, whereby as the member approaches the selected heading the velocity of rotation of said member decreases.

18. The controller as set forth in claim 10 wherein the rotator includes means for detecting the heading of the rotatable member, said control means being connected to the heading detecting means and being responsive thereto to periodically generate digital signals representing the heading detected by the detecting means, further including an electromechanical speaker and means connected to the control means and to the speaker for converting the digital signals representing headings into corresponding analog input signals from which the speaker acoustically announces the headings detected by the heading detecting means.

19. The controller as set forth in claim 18 further including user operable means for selecting headings, said control means being responsive to operation of the heading selecting means to periodically supply digital signals representing the heading selected to the converting means so that the speaker acoustically announces the heading selected.

* * * * *